US008649394B1

(12) United States Patent
Walker

(10) Patent No.: US 8,649,394 B1
(45) Date of Patent: Feb. 11, 2014

(54) ASYNCHRONOUS EXTENSION TO SERIALIZER/DESERIALIZER FRAME INTERFACE (SFI) 4.2

(75) Inventor: Timothy P. Walker, Boxford, MA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 525 days.

(21) Appl. No.: 12/905,005

(22) Filed: Oct. 14, 2010

(51) Int. Cl.
*H04J 3/22* (2006.01)

(52) U.S. Cl.
USPC ............................................. 370/467

(58) Field of Classification Search
USPC .................................. 370/474, 503
See application file for complete search history.

(56) References Cited

U.S. PATENT DOCUMENTS

| | | | |
|---|---|---|---|
| 4,674,087 A * | 6/1987 | Green et al. ................. | 370/524 |
| 6,954,466 B1 * | 10/2005 | Dalleggio et al. ............ | 370/463 |
| 7,047,479 B1 * | 5/2006 | Hagh-Panah et al. ......... | 714/774 |
| 8,199,772 B2 * | 6/2012 | Surek ............................ | 370/467 |
| 2004/0228364 A1 * | 11/2004 | Walker et al. ................. | 370/470 |
| 2005/0286521 A1 * | 12/2005 | Chiang et al. ................. | 370/389 |
| 2006/0206642 A1 * | 9/2006 | Wedding ....................... | 710/71 |
| 2011/0081872 A1 * | 4/2011 | Bar-Sade et al. ............. | 455/77 |
| 2012/0250580 A1 * | 10/2012 | Testa et al. ................... | 370/254 |

* cited by examiner

*Primary Examiner* — Chandrahas Patel
*Assistant Examiner* — Lan Truong

(57) ABSTRACT

A system and method are provided for transmitting and receiving asynchronous channels of information via a SerDes Frame Interface (SFI) 4.2 interface. The SerDes device accepts a plurality of channels operating at asynchronous channel clock rates. Bytes of data from each channel are loaded into a source at the channel clock rates. Once loaded, the bytes of data for each channel are drained from the source at a line clock rate and interleaved into four 64-bit segments. A 2-bit control word is added to each segment, creating 66/64-bit data blocks. The control word indicates the validity of bytes of data within the 66/64-bit data blocks. Then, the 66/64 bit data blocks are transmitted via a SFI4.2 interface in four lanes, at a rate proportional to the line clock rate.

30 Claims, 13 Drawing Sheets

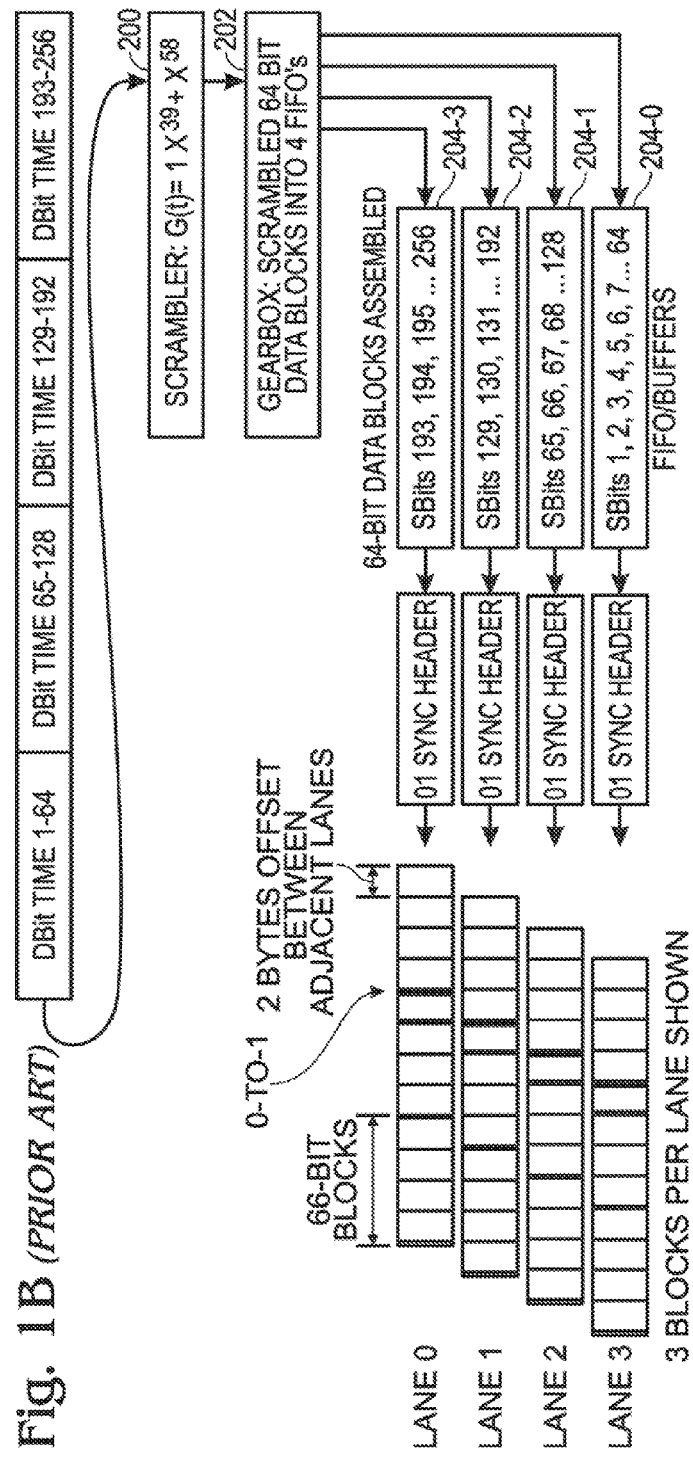
Fig. 1A (PRIOR ART)
Fig. 1B (PRIOR ART)

Fig. 2 (PRIOR ART)

| INPUT DATA BIT POSITION: BLOCK DATA FORMAT | 0 1 SYNC | 2 ... 65 BLOCK PAYLOAD | | | | | | | |
|---|---|---|---|---|---|---|---|---|---|
| | | $D_0$ BLOCK TYPE FIELD | $D_1$ | $D_2$ | $D_3$ | $D_4$ | $D_5$ | $D_6$ | $D_7$ |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ |
| CONTROL BLOCK FORMATS: | | | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | $S_4$ | $D_5$ | $D_6$ | $D_7$ |
| $O_0D_1D_2D_3/S_4D_5D_6D_7$ | 10 | 0x66 | $O_0$ | $D_1$ | $D_2$ | $D_3$ | $S_4$ | $D_5$ | $D_6$ | $D_7$ |
| $O_0D_1D_2D_3/O_4D_5D_6D_7$ | 10 | 0x55 | $O_0$ | $D_1$ | $D_2$ | $D_3$ | $O_4$ | $D_5$ | $D_6$ | $D_7$ |
| $S_0D_1D_2D_3/D_4D_5D_6D_7$ | 10 | 0x78 | $S_0$ | $D_1$ | $D_2$ | $D_3$ | $D_4$ | $D_5$ | $D_6$ | $D_7$ |
| $O_0D_1D_2D_3/C_4C_5C_6C_7$ | 10 | 0x4b | $O_0$ | $D_1$ | $D_2$ | $D_3$ | $C_4$ | $C_5$ | $C_6$ | $C_7$ |
| $T_0C_1C_2C_3/C_4C_5C_6C_7$ | 10 | 0x87 | $T_0$ | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | $T_1$ | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | $T_2$ | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | $T_3$ | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | $T_4$ | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | $T_5$ | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | $T_6$ | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | $T_7$ |

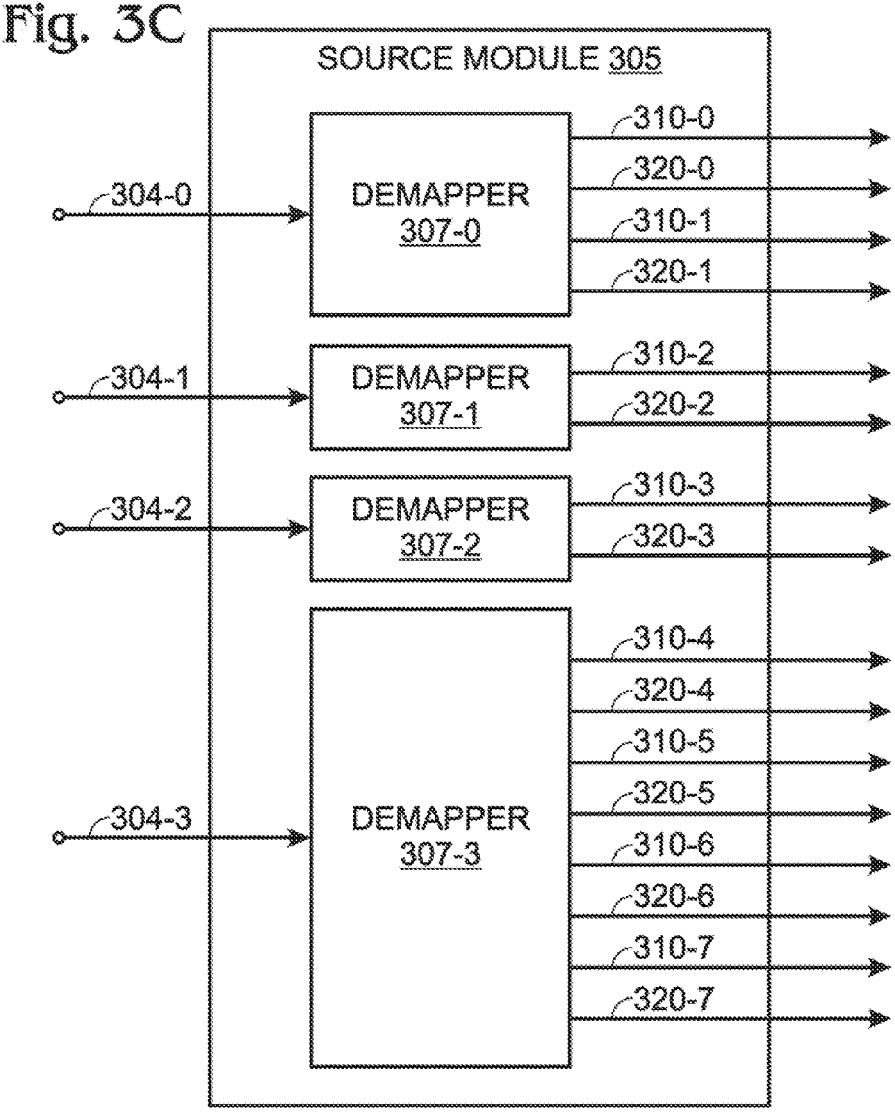

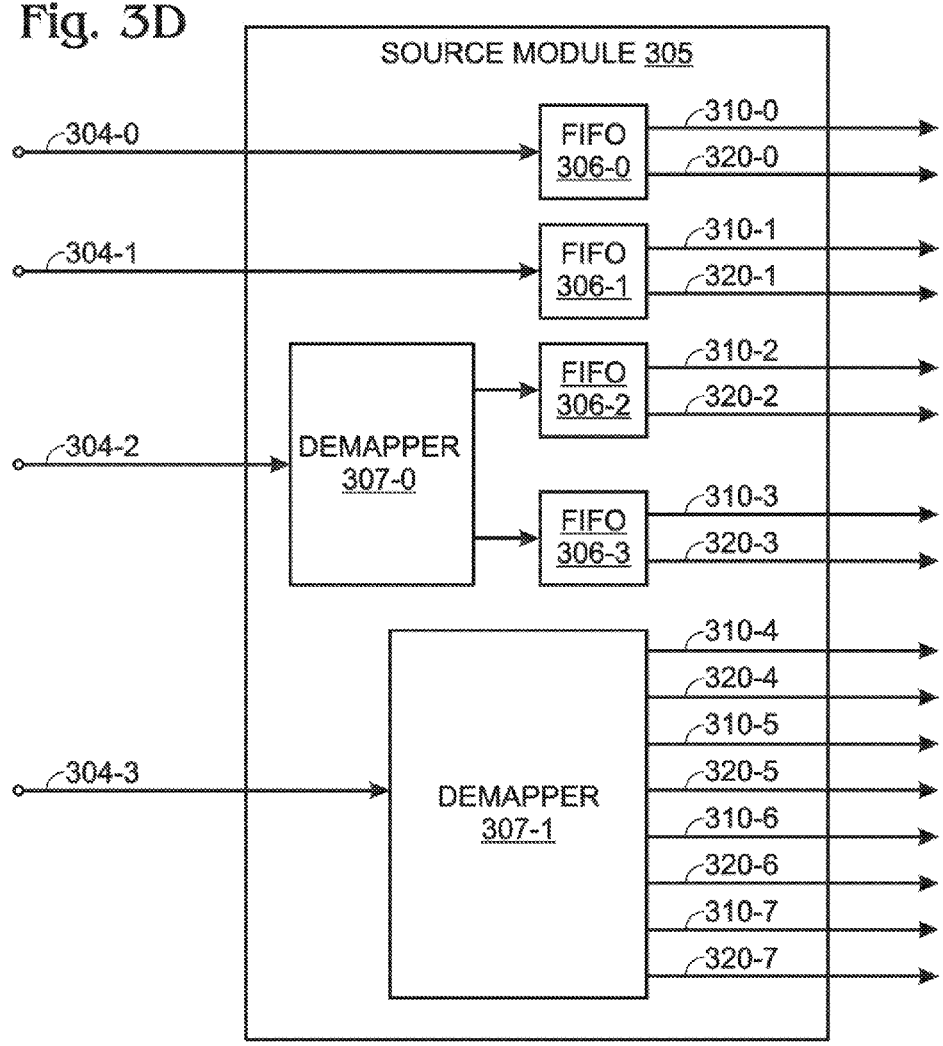

Fig. 5

| CHANNEL | | | | | | | | SEGMENT CONTROL WORD | BLOCK PAYLOAD | | | | | | | |
|---|---|---|---|---|---|---|---|---|---|---|---|---|---|---|---|---|
| 304-0 | 304-1 | 304-2 | 304-3 | 304-4 | 304-5 | 304-6 | 304-7 | | BIT[2] | | | | | | | BIT[65] |
| D0 | D1 | D2 | D3 | D4 | D5 | D6 | D7 | "01" | D0 | D1 | D2 | D3 | D4 | D5 | D6 | D7 |
| nv | D1 | D2 | D3 | D4 | D5 | D6 | D7 | "10" | "0x7F" | D1 | D2 | D3 | D4 | D5 | D6 | D7 |
| D0 | nv | D2 | D3 | D4 | D5 | D6 | D7 | "10" | "0XBF" | D0 | D2 | D3 | D4 | D5 | D6 | D7 |
| D0 | D1 | nv | D3 | D4 | D5 | D6 | D7 | "10" | "0xDF" | D0 | D1 | D3 | D4 | D5 | D6 | D7 |
| D0 | D1 | D2 | nv | nv | D5 | D6 | D7 | "10" | "0xFE" | D0 | D1 | D2 | xx | D5 | D6 | D7 |
| D0 | D1 | D2 | nv | D4 | D5 | D6 | D7 | "10" | "0xEE" | xx | D1 | D2 | D4 | D5 | D6 | D7 |
| nv | nv | nv | D3 | D4 | D5 | D6 | D7 | "10" | "0x1F" | xx | xx | D3 | D4 | D5 | D6 | D7 | xx = MAY BE ANY VALUE

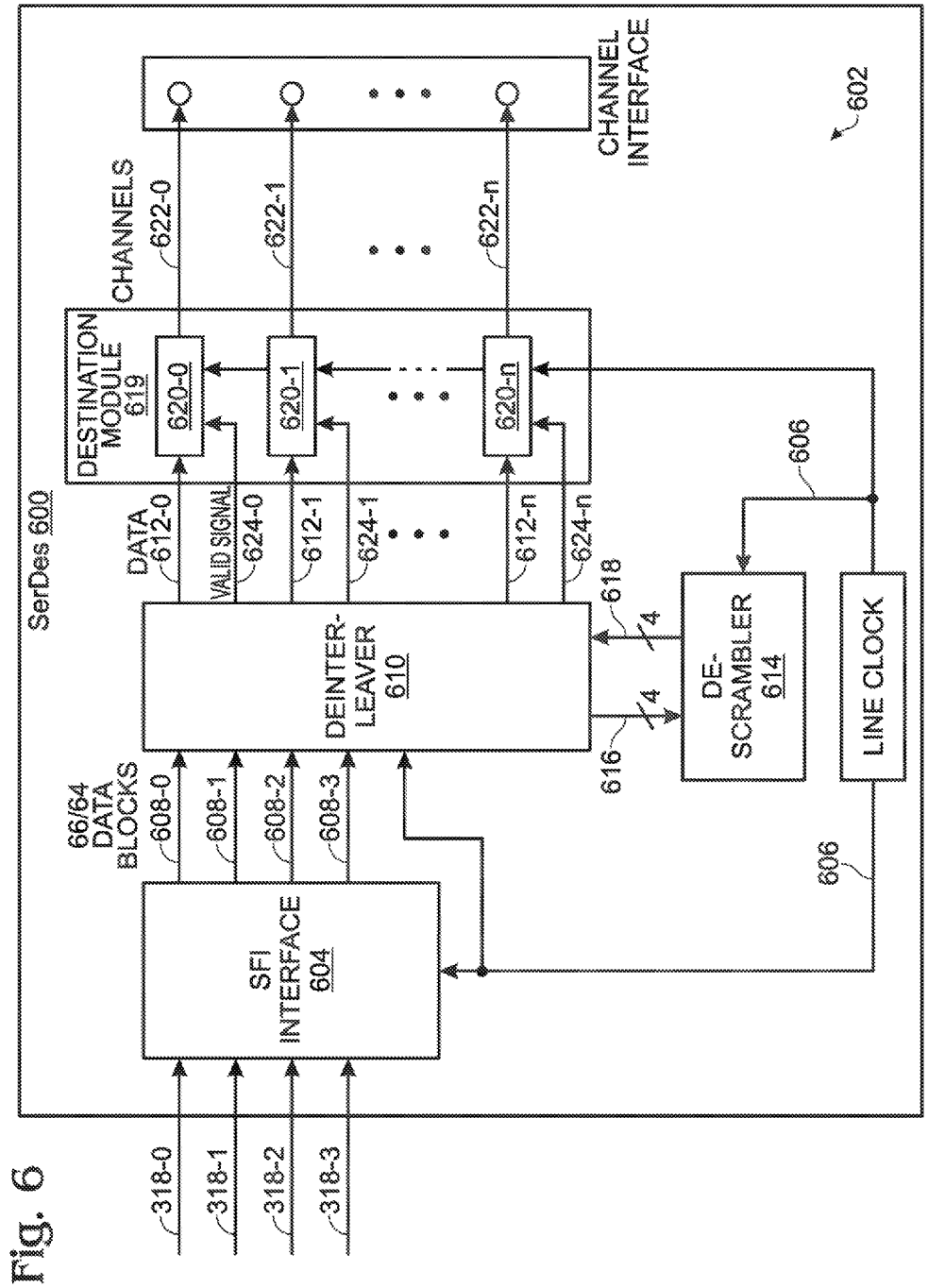

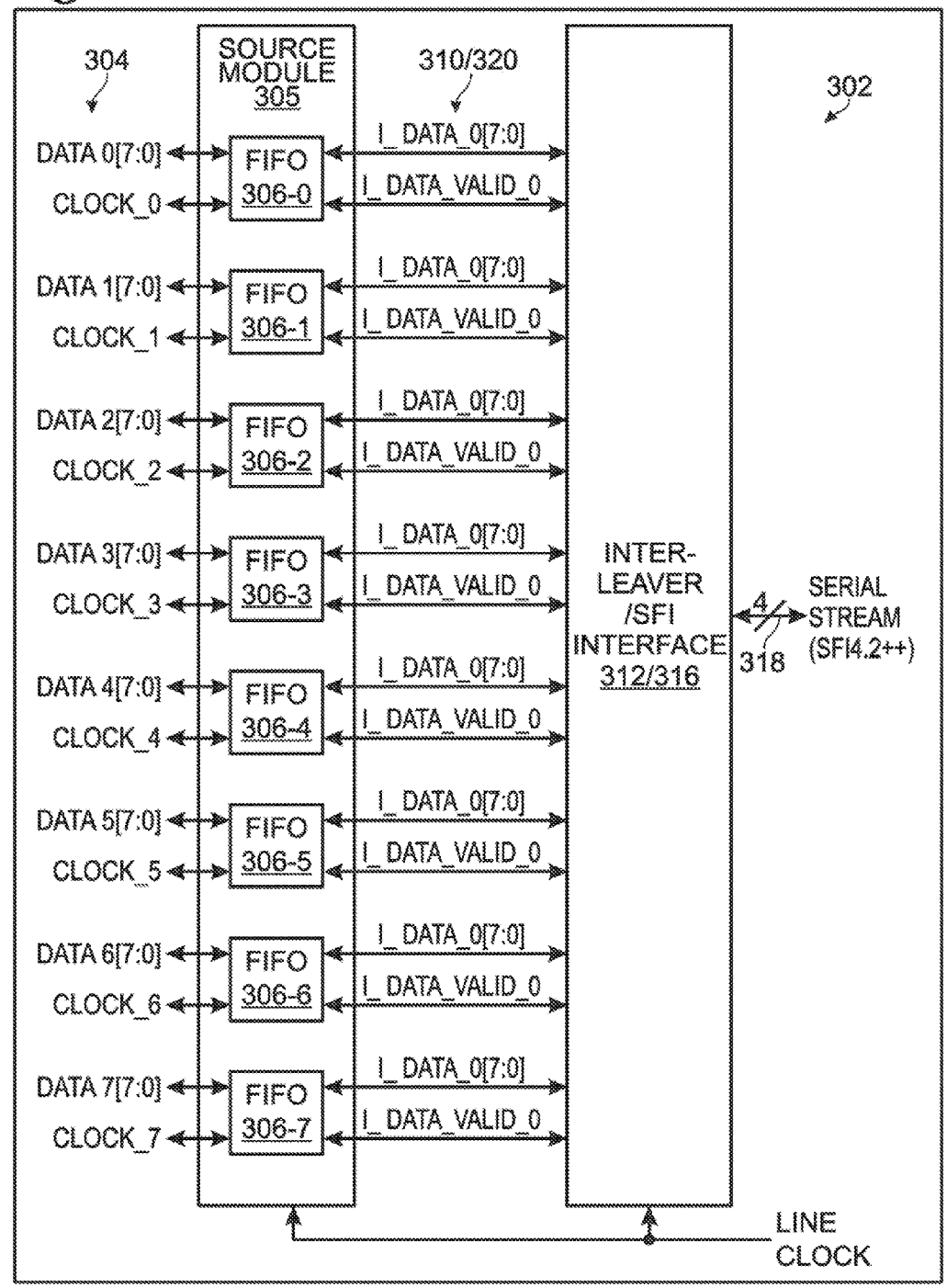

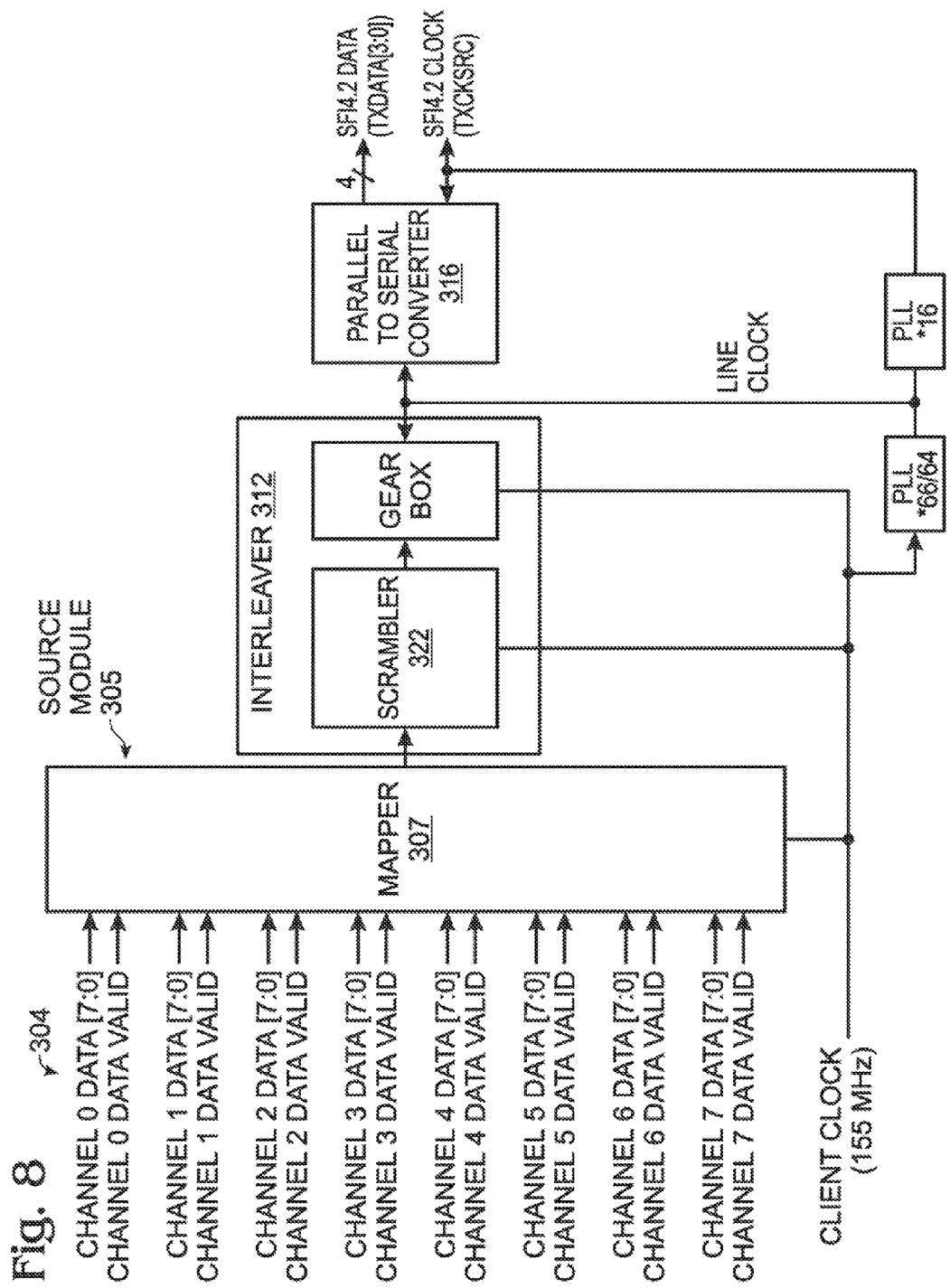

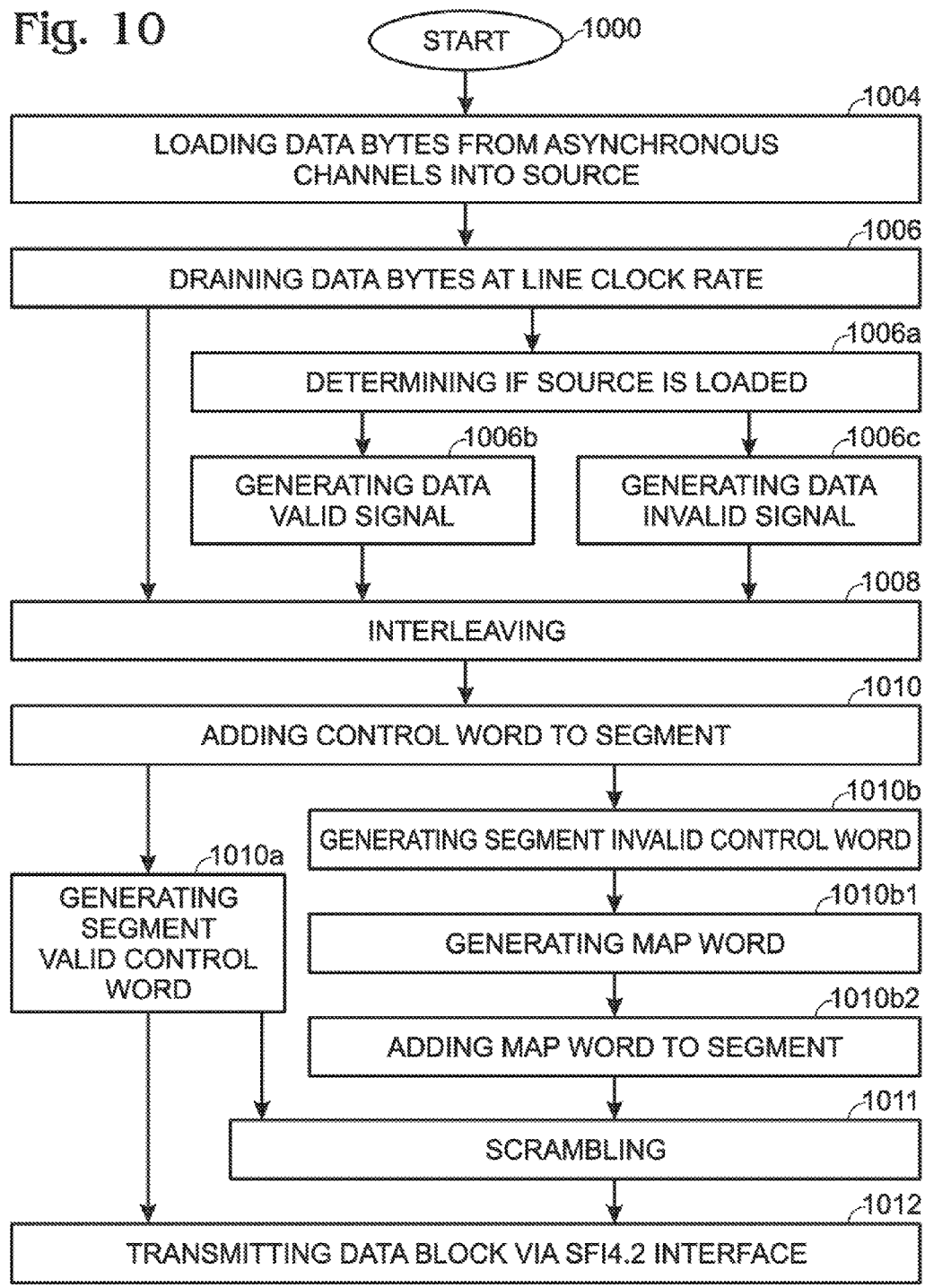

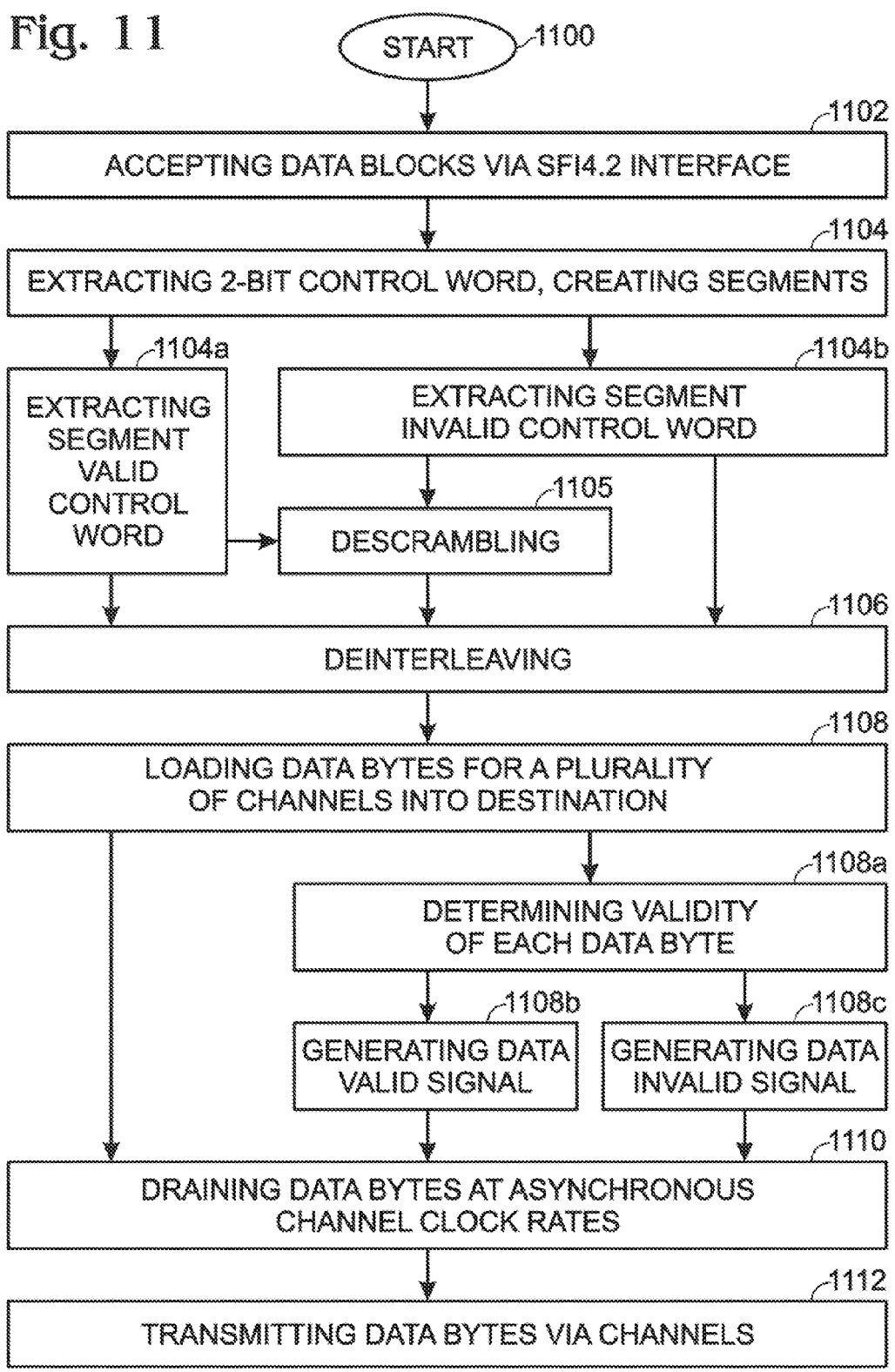

ASYNCHRONOUS EXTENSION TO SERIALIZER/DESERIALIZER FRAME INTERFACE (SFI) 4.2

BACKGROUND OF THE INVENTION

1. Field of the Invention

This invention generally relates to communication interfaces and, more particularly, to a system and method for transporting asynchronous data channels through a SFI4.2 interface.

2. Description of the Related Art

FIG. 1A is a schematic diagram depicting an SFI4.2 transceiver (prior art). A serial stream, divided into 64-bit segments, is received/transmitted at a clock rate of about 10 gigahertz (10 G), and transmitted/received via four SFI4.2 traffic lanes, at about 2.5 G per lane.

FIG. 1B is a logical model of an SFI4.2 transmit interface (prior art). A serial aggregate data stream is scrambled and striped into data lanes. The data is divided into 64-bit segments and scrambled. A "gearbox" 202 splits the data into four FIFOs (buffers) 204-0 through 204-3. The first 64-bit segment received is written into the buffer 204-0 associated with SLC10G_u_SFI4P2_TX_logical_lane[3] and the last segment is written into the buffer 204-3 associated with SLC10G_u_SFI4P2TX_logical_lane[0]. The buffers act as a set of FIFOs to bridge between the input timing domain and the transmit interface (line clock) timing domain.

A 01 sync header is prepended to each 64-bit segment to construct a 66-bit block prior to transmission. Each lane is transmitted 2 bytes (16 bits) after the previous lane so that the 4 lanes can start transmission in a 66-bit time period. SFI4.2 is a four lane interface, so each lane corresponds to an output driver.

In the receive direction, each lane has a framer that looks for "01" separated by 64 bits. Once it finds that word, then it goes "InFrame". The data from the four lanes is recombined and descrambled, recreating the original signal. The transmit (line) clock for each SFI4.2 lane is 66/64 times the data clock used to load the FIFOs. The transmit and data clocks are synchronized.

FIG. 2 is the IEEE 802.3 method of 64b/66b encoding from FIG. 49-7 Section 49.2.4.4 of IEEE802.3-2008 (prior art). The method uses a 2-bit synchronization field. When the synchronization (sync) field is "10", the following byte defines a Block Type field as a control code.

The current 10 G interface defined by the Optical Internetworking Forum (OIF) SFI4.2 (OIF-SFI4-02.0) is a synchronous interface. It is designed for 10 G, or slightly higher signals. SFI4.2 does not have the capability of supporting asynchronous signals or combinations of asynchronous sub-rate signals. It has one clock and four data lines.

One approach to building an asynchronous SFI4.2 interface would be to map the asynchronous subrate signals to another frequency and then transport them across SFI4.2. However, this would increase the operating rate of the SFI4.2 to higher than required.

It would be advantageous if a SFI4.2 interface could be adapted to communicate with one or more asynchronous data channels.

SUMMARY OF THE INVENTION

Described herein is a SerDes Frame Interface (SFI) 4.2 interface that can handle one 10 gigahertz (10 G) signal, four asynchronous 2.5 G signals, 8 asynchronous 1.25 G signals, or any combination of 1.25 G and 2.5 G signals adding up to 10 G. This interface takes 8 channels of 8-bit data bytes, each operating with a unique clock, and with the use of "data valid" signaling, transports them synchronously across an SFI4.2 Interface at the line clock rate.

Accordingly, in a serializer/deserializer (SerDes) device, a method is provided for transmitting asynchronous channels of information via a SerDes SFI4.2 interface. The SerDes device loads a plurality of channels operating at asynchronous clock rates into a source. The source may be a plurality of first-in first-out (FIFO) memories, a demapper, a plurality of demappers, or a combination of demappers and FIFOs. Once loaded, the bytes of data for each channel are drained from the source at the line clock rate and interleaved into four 64-bit segments. A 2-bit control word is added to each segment, creating 66/64-bit data blocks. The control word indicates the validity of bytes of data within the 66/64-bit data blocks. Then, the 66/64 bit data blocks are transmitted via a SFI4.2 interface in four lanes, at a rate proportional to the line clock rate.

When draining the bytes from the source, it is determined if source is loaded with a byte of data for each channel. If the source is loaded with a byte of data for a particular channel, a data valid signal is generated for that channel. If the source is not loaded with a byte of data, a data invalid signal is generated for that channel. A segment valid 2-bit control word is added to a segment in response to receiving a data valid signal for every byte of data in the segment. Alternatively, a segment invalid control word is added to a segment in response to receiving a data invalid signal for at least one byte of data in the segment.

In the opposite traffic flow direction, the SerDes device accepts four lanes of 66/64 bit data blocks via a SFI4.2 interface at a rate proportional to a line clock rate. A 2-bit control word is extracted from each data block, creating 64-bit segments. As above, the control word indicates the validity of bytes of data in the segment. The segments are deinterleavered into bytes of data, and bytes of data are loaded for a plurality of channels, at the line clock rate, into a destination (FIFOs and/or mappers). The bytes of data for each channel are drained from the destination at an asynchronous channel clock rate, and transmitted at the channel clock rate.

A segment valid 2-bit control word is extracted if the segment contains only valid bytes of data. A segment invalid control word indicates that the segment includes at least one invalid byte of data. If a byte of data is valid for a channel, it is loading into the destination and a data valid signal is generated for that channel. If a byte of data is invalid, no data is loaded into the destination, and a data invalid signal is generated for that channel. The destination is drained only if data valid signals are received for channels.

Additional details of the above-described method and related SerDes device SFI4.2 systems are presented in more detail below.

BRIEF DESCRIPTION OF THE DRAWINGS

FIG. 1A is a schematic diagram depicting an SFI4.2 transceiver (prior art).

FIG. 1B is a logical model of an SFI4.2 transmit interface (prior art).

FIG. 2 is the IEEE 802.3 method of 64b/66b encoding from FIG. 49-7 Section 49.2.4.4 of IEEE802.3-2008 (prior art).

FIGS. 3A through 3D are schematic block diagrams of a serializer/deserializer (SerDes) device with a system for transmitting asynchronous channels of information via a SerDes Frame Interface (SFI) 4.2 interface.

FIG. 5 is an exemplary table cross-referencing map words to ((n+1)=8) channels and to ((n+1)=8) data byte positions.

FIG. 6 is a SerDes device with a system for transmitting SerDes SFI4.2 interface lanes via asynchronous channels.

FIG. 7 is a schematic diagram depicting a first exemplary embodiment of the system of FIG. 3.

FIG. 8 is a schematic diagram depicting a second exemplary embodiment of the system of FIG. 3.

FIG. 10 is a flowchart illustrating a method for transmitting asynchronous channels of information via a SerDes SFI4.2 interface.

FIG. 11 is a flowchart illustrating a method for transmitting SerDes SFI4.2 interface lanes via asynchronous channels.

DETAILED DESCRIPTION

Figure 3A:
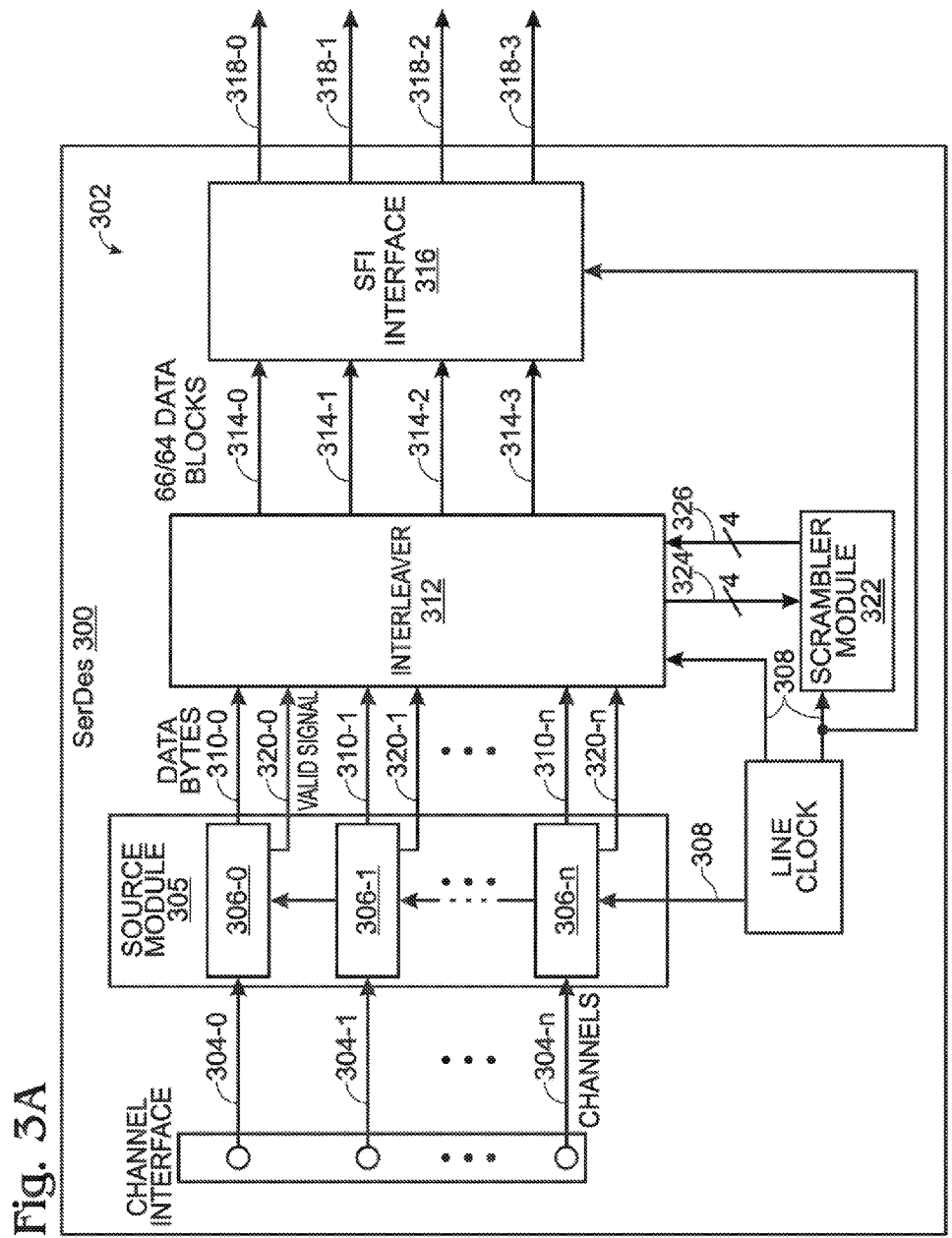

FIGS. 3A through 3D are schematic block diagrams of a serializer/deserializer (SerDes) device 300 with a system for transmitting asynchronous channels of information via a SerDes Frame Interface (SFI) 4.2 interface. In FIG. 3A, the system 302 comprises a channel interface accepting bytes of data for a plurality of channels 304 at corresponding asynchronous channel clock rates. Shown are channel 304-0 through 304-n, where n is an integer variable. The clock rates of the channels may, or may not, be synchronous with each other. The system 302 is enabled to operate with the channel interfaces being asynchronous with the system's line clock, as explained in more detail below. However, the system is also enabled if one or more of the channel interfaces is synchronous with the system clock.

Typically, n is equal to 7. For example, the channels 304 may be one 10 gigahertz (10 G) data rate channel, which is segmented into eight 1.25 (G) data rate channels 304-0 through 304-7. Alternatively, the channel interface may be four 2.5 G data rate channels, which are segmented into eight 1.25 (G) data rate channels. In another aspect, there may be three 2.5 G data rate channels (segmented into six 1.25 (G) data rate channels) and two 1.25 G data rate channels. In a similar manner, the channel interface may be two 2.5 G and four 1.25 G data rate channels, one 2.5 G and six 1.25 G data rate channels, or eight 1.25 G data rate channels.

A source module 305 is shown. As shown, the source module 305 may be a plurality of first-in first-out (FIFO) memories 306. A FIFO is a memory that loads bits sequentially, and outputs the bits in the order in which they were received. Alternatively as explained in more detail below, the source module be comprised of a demapper, a plurality of demappers, or a combination of FIFOs and demappers. A demapper is a buffer memory that is typically used to adjust the timing of information passed between asynchronous timing domains. The source module 305 has an input for loading bytes of data from a each channel 304, and an output on line 310 for draining the bytes of data, at a line clock rate, for each channel on line 308. The line clock rate is 66/64 times the rate of each channel rate. An interleaver 312 or gearbox has an input on line 310 connected to receive the bytes of data the source module 305. The interleaver 312 interleaves the bytes of data into four 64-bit segments, and adds a 2-bit control word to each segment, creating 66/64-bit data blocks supplied at an output on lines 314-0 through 314-3. The added overhead is the reason that the line clock rate is slightly faster than the channel clock rates. The control word indicates the validity of bytes of data within the 66/64-bit data blocks. An SFI interface 316 has an input to accept the 66/64 bit data blocks on lines 314-0 through 314-3 and an output on lines 318-0 through 318-3 to supply the data blocks via a SFI4.2 interface at a rate proportional to the line clock rate. Typically, the data rate of each SFI4.2 lane is about 2.5 G. However, the system is not limited to any particular rate.

Figure 3B:
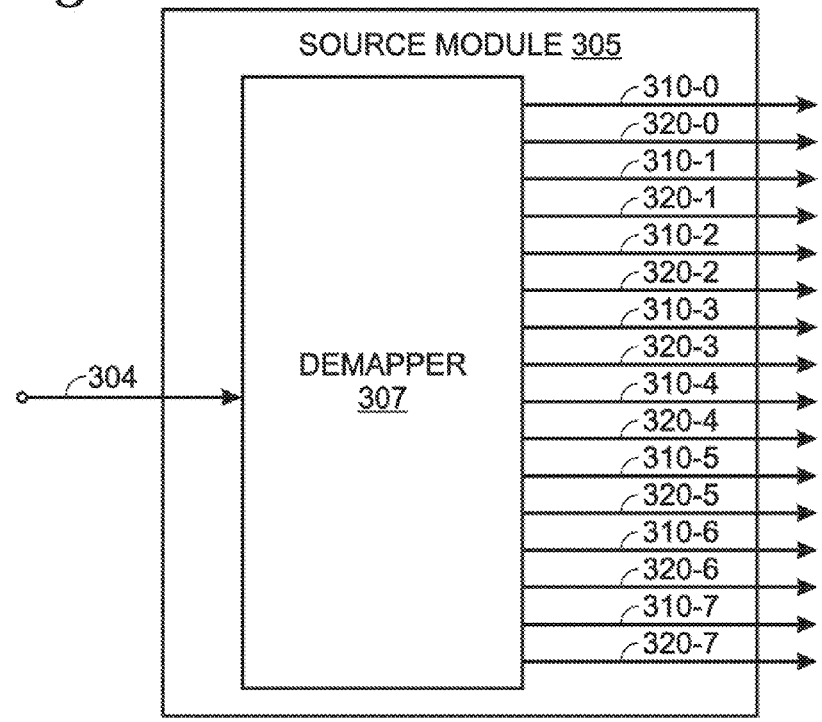

FIG. 3B is a detailed depiction showing the source module enabled as a demapper. Here the demapper 307 accepts a single channel (e.g., 10 G) at the input 304, and supplies eight 1.25 G channels at an output.

FIG. 3C is a detailed depiction showing the source module enabled as a plurality of demappers. Here demapper 307-0 accepts a channel (e.g., 2.5 G) 304-0 and supplies two 1.25 G channels at an output. To continue the example, demappers 307-1 and 307-2 accept 1.25 G channels, respectively, on line 304-1 and 304-2. Demapper 307-3 accepts a 5 G channel on line 304-3 and supplies four 1.25 G channels.

FIG. 3D is a detailed depiction showing the source module enabled as a combinations of FIFOs and demappers. Here FIFOs 306-0 and 306-1 each accept a channel (e.g., 1.25 G) 304-0 and 304-1, and each supply a 1.25 G channel at an output. To continue the example, demapper 307-0 accepts a 2.5 G channel and supplies two 1.25 G channels via FIFOs 306-2 and 306-3. Demapper 307-1 accepts a 5 G channel on line 304-3 and supplies four 1.25 G channels.

Returning to FIG. 3A, the system 302 may also include a scrambler module 322 having an input on lines 324-0 through 324-3 to accept the four 64-bit segments and an output on lines 326-0 through 326-3 to supply four 64-bit scrambled segments. The scrambler module 322 rearranges the segment bit order in a pseudorandom order according to a predetermined code. However, the system 302 can also be enabled without the scrambler module.

The source module 305 generates a data valid signal on line 320 for each channel if it is loaded with a byte of data, and generates a data invalid signal for that channel if it not loaded with a byte of data. The interleaver 312 accepts the data valid or data invalid signals on lines 320-0 through 320-n and generates a segment valid 2-bit control word in response to receiving a data valid signal for every byte of data in the segment. A segment invalid control word is generated in response to receiving a data invalid signal for at least one byte of data in the segment.

Figure 4:
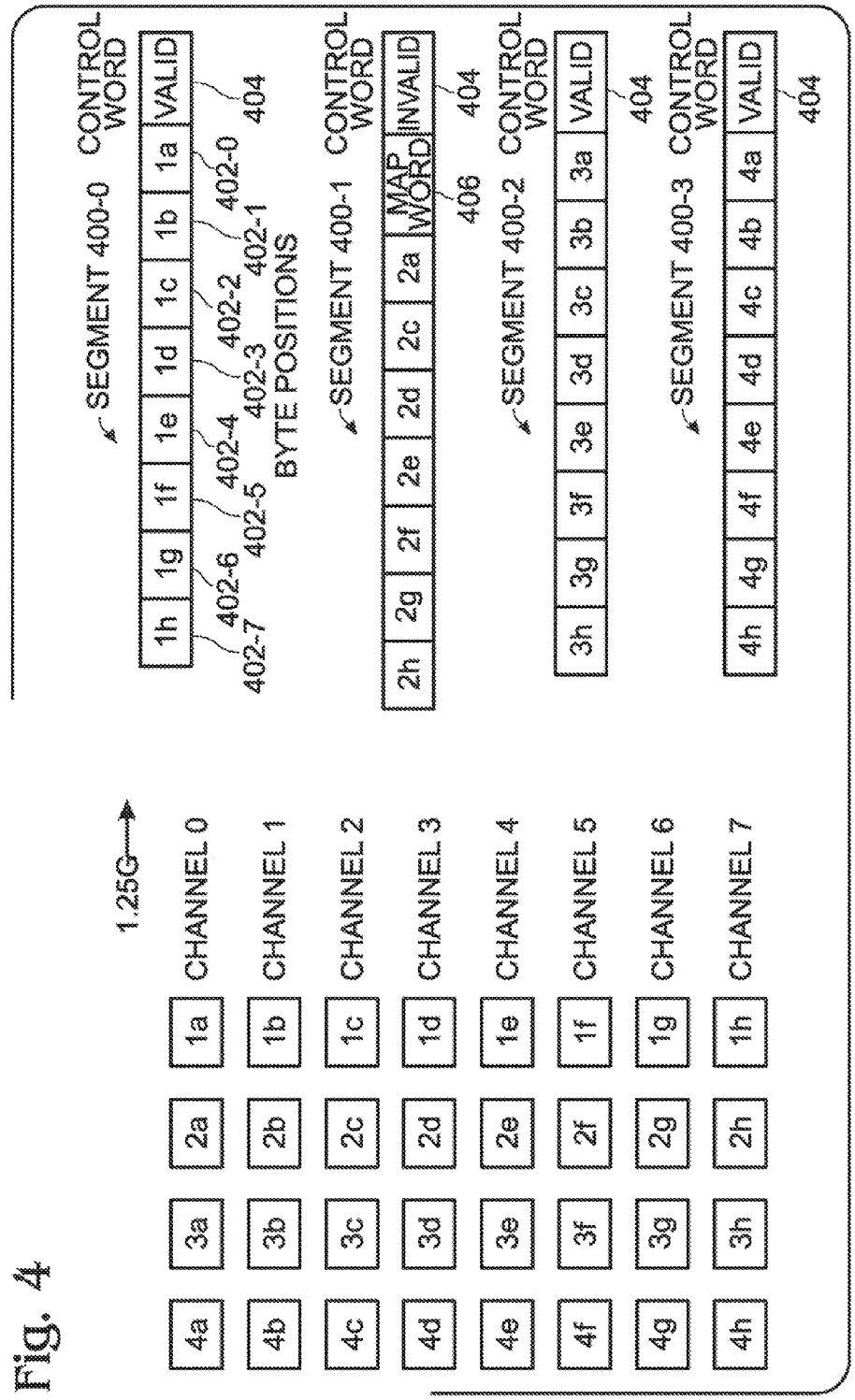
FIG. 4 is a diagram depicting an exemplary mapping of bytes of data, sourced from the channel interface, to the SFI4.2 interface.

FIG. 4 is a diagram depicting an exemplary mapping of bytes of data, sourced from the channel interface, to the SFI4.2 interface. The interleaver interleaves the bytes of data into a sequence of byte positions. As shown, segment 400-0 has byte positions 402-0 through 402-n. In this example, n=7. If a segment control word 404 is valid, each byte position 402 in the segment contains a byte of data, as shown in segment 400-0. In response to a segment invalid control word 404, as shown in segment 400-1, the interleaver generates a map word 406 cross-referencing valid bytes of data in the segment to byte positions, and adds the map word to the segment in a predetermined byte position. The map word 406 cross-references valid bytes of data to corresponding channels, and to byte positions in the segment. As shown, the interleaver acids the map word to a segment in place of an invalid byte of data. In one aspect, as shown, the interleaver shifts the valid bytes of data to end byte positions in the segment and adds the map word to an initial byte position in the segment. However, the map word and valid data bytes may be alternatively positioned in the segment.

FIG. 5 is an exemplary table cross-referencing map words to ((n+1)=8) channels and to ((n+1)=8) data byte positions. The first row depicts a segment with a segment valid control word (01), and with all valid data bytes. There is no map word. In rows 2 through 7, there is at least one invalid data byte in each segment. For example, in row 2, channel 304-0 (D0) fails to supply a data byte, which is represented as "nv". The segment invalid control word (10) indicates that there is at least one invalid data byte in the segment. The map word is located in the first byte position, and the code "0x7F" indicates that it is the first byte position, which is associated with channel 304-0 (D0), that is invalid. In row 7, channels 304-0 (D0), 304-1 (D1), and 302-2 (D2) fail to supply a data byte. The segment invalid control word (10) indicates that there is at least one invalid data byte in the segment. The map word is located in the first byte position, and the code "0x1F" indicates that it is the first three byte positions, which are associated respectively with channels 304-0 (D0), 304-1 (D1), and 304-2 (D2), that are invalid. Unused byte positions values are not specified and may, for example, be filled with 0's.

FIG. 6 is a SerDes device 600 with a system 602 for receiving SerDes SFI4.2 interface lanes and transmitting asynchronous channels. The system 602 essentially reverses the process described in FIG. 3. In one aspect, a SerDes transceiver includes both the system 302 of FIG. 3 and system 602. The system 602 comprises an SFI module 604 having a SFI4.2 interface to accept four lanes of 66/64 bit data blocks on lines 318-0 through 318-3 at a rate proportional to a line clock rate on line 606. The SFI module 604 has an output on lines 608-0 through 608-3 to supply the data blocks. Ideally, the line clock on line 606 is synchronous with the line clock of FIG. 3. However, if systems 302 and 602 are collocated in the same transceiver, and not communicating with each other via the SFI4.2 interface, the two line clocks are not synchronous.

A deinterleaver 610 has an input on lines 608-0 through 608-3 to accept the data blocks. The deinterleaver 610 extracts the 2-bit control word from each data block, creating 64-bit segments. As explained above, the control words indicate the validity of bytes of data in the segment. The segment is deinterleaved into bytes of data supplied at an output on lines 612-0 through 612-n. If the SFI transmission was scrambled, a descrambler 614 has an input on line 616-0 through 616-3 to accept the four 64-bit segments and an output on lines 618-0 through 618-3 to supply four descrambled 64-bit segments.

A destination module 619 is shown with FIFOs 620, each have an input on line 612 to load bytes of data at the line clock rate on line 606. The destination module 619 has an output to supply the bytes of data for each channel 622 at an asynchronous channel clock rate. Each channel 622 supplies the bytes of data at the corresponding channel clock rate. As noted above in the explanation of FIGS. 3A-3D, channels may be considered as subchannels in one of the following channel interfaces: one 10 gigahertz (10 G), four 2.5 G, three 2.5 G and two 1.25 G, two 2.5 G and four 1.25 G, one 2.5 G and six 1.25 G, or eight 1.25 G data rate channels. Alternatively but not shown, the destination module may be a single mapper, a plurality of mappers, or a combination of FIFOs and mappers, analogous to the source modules described above in the explanations of FIGS. 3A through 3D.

The deinterleaver 610 extracts a segment valid 2-bit control word in response to the receiving a segment with only valid bytes of data, and extracts a segment invalid control word in response to receiving a segment with at least one invalid byte of data. The deinterleaver 610 generates a data valid signal on line 624 for each corresponding valid byte of data and a data invalid signal on line 624 for each corresponding invalid byte data. The destination module 619 has an input on lines 624-0 through 624-n to accept the data valid and data invalid signals. The destination module 619 loads a byte of data for a channel from the deinterleaver 610 in response to a corresponding data valid signal, and does not attempt to load a byte of data for a channel in response to a corresponding data invalid signal.

Referring back to FIGS. 4 and 5, the deinterleaver creates segments with sequential byte positions, and in response to a segment invalid control word, extracts a map word. The map word is located in a predetermined byte position in the segment, and it cross-references valid bytes of data in the segment to byte positions. More explicitly, the map word cross-references valid bytes of data to corresponding channels, and to byte positions in the segment. The deinterleaver extracts the map word from the segment in place of an invalid byte of data. As shown in the example of FIG. 5, the valid bytes of data may be shifted to end byte positions in the segment, while the map word occupies the initial byte position in the segment.

Functional Description

In conventional SFI4-2, the data is 64b/66b encoded by adding two bits ("01") in front of every 8 bytes (64 bits). In the systems described above in FIGS. 3 and 6, each byte of the "8 bytes" can represent one lane of a 10 G signal, a single ODU0 (1.25 G) channel, or one of two lanes of an ODU1 (2.5 G) channel. The ODU0 and ODU1 channels are asynchronous to the data clock. Thus, there are times when the data isn't valid. To address this issue, each 8-bit data channel has its own "DataValid" signal. The overall data interface is 8 lanes of 8 bits (total 64-bit interface), where each lane (8 bits) has one DataValid signal.

If any lane doesn't have valid data for a byte, then instead of adding "01" as the control word, bits "10" (bits 0, 1 in the data block) can be used, for example. The byte at bits 2-9 is a map word. In one aspect, each bit in the map word is a "Data Valid" indicator for a corresponding data byte. The valid data bytes are then filled in from the MSB to LSB.

For example, if lanes (channels) 0, 1, 2 don't have valid data, but lanes 3-7 do, instead of adding a segment control word of "01", "10" is added, and the next byte (the map word) is 0x1F, see FIG. 5, row 7. The following two bytes in the segment are Don'tCare" (xx), followed by the data in lanes 3-7. This makes up a 66-bit codeword. At the receiver side, the data block is decoded with the understanding that lanes 0-2 have DataValid low (not valid), and lanes 3-7 have valid data.

One key difference between a conventional SFI4.2 interface and the systems of FIGS. 3 and 6 is the addition of a "data_valid" signal on the client side (channel interface). The client side consists of eight 8-bit data paths, each with a data_valid associated with it. When "data_valid" is high, that means that the data in the data path is valid. When "data_valid" is low (data byte invalid), the data in the data path is not valid.

FIG. 7 is a schematic diagram depicting a first exemplary embodiment of the system of FIG. 3. For example, there may be eight ODU0's, each of which is represented on the client side as eight bits of data and an associated clock. The clock for each ODU0 can be at a different frequency. Since SFI4.2 is a synchronous interface, there needs to be a way of representing eight asynchronous signals on a synchronous interface.

The other side of each FIFO 306 is clocked using the line clock. In the client-to-line direction (Tx), if there is no data in the FIFO when the line clock is active, then data_valid_n is deasserted. If there is data in the FIFO, then data_valid_n is asserted. Thus, there are eight sets of 8-bit data and an associated data_valid. In the line-to-client direction (Rx), if data_ valid is not asserted, then no data is written into the FIFO. Note: If all eight signals are synchronous and at the same rate as the line clock, then the channel interface is the same as SFI4.2.

FIG. 8 is a schematic diagram depicting a second exemplary embodiment of the system of FIG. 3. The eight bits of channels 0 through 7 are loaded in parallel, so that the byte data rate is 155 megahertz (MHz). A phase-locked loop (PLL) generates a line clock that is 66/64 times the rate of the client clock.

Figure 9:
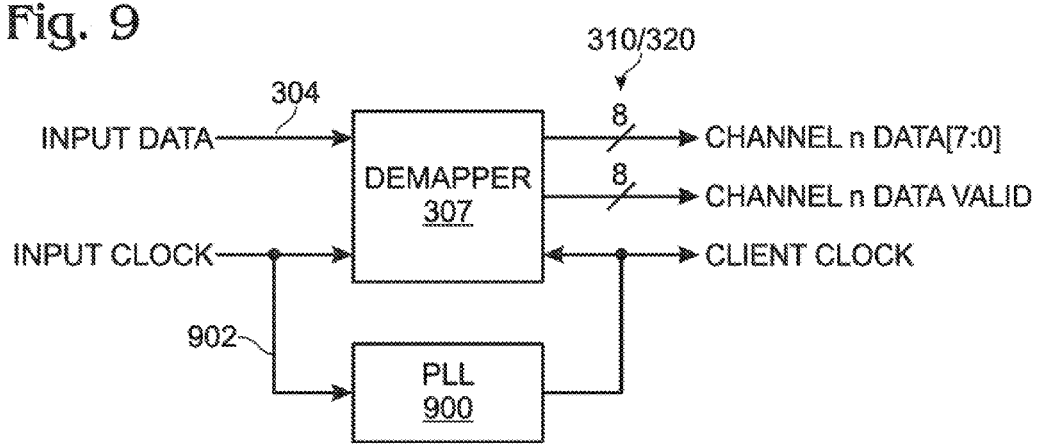
FIG. 9 is a schematic diagram depicting a system for demapping a channel into eight lower data rate subchannels.

FIG. 9 is a schematic diagram depicting a system for demapping a channel into eight lower data rate subchannels. The demapper 307 accepts the serial stream of data (InputData) 304 and associated input clock on line 902. The input clock is also input into PLL 900, where it is used to synchronize the client clock. In this example, the client clock may be synchronous with line clock (not shown), while the input clock is asynchronous with the line clock.

FIG. 10 is a flowchart illustrating a method for transmitting asynchronous channels of information via a SerDes SFI4.2 interface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1000.

Step 1004 loads bytes of data from a plurality of channels operating at asynchronous clock rates into a source. For example, one of the following sets of channels may be loaded: one 10 gigahertz (10 G), four 2.5 G, three 2.5 G and two 1.25 G, two 2.5 G and four 1.25 G, one 2.5 G and six 1.25 G, or eight 1.25 G data channels. Step 1006 drains the bytes of data for each channel from the source at the line clock rate. Step 1008 interleaves the bytes of data into four 64-bit segments. Step 1010 adds a 2-bit control word to each segment, creating 66/64-bit data blocks. The control word indicates the validity of bytes of data within the 66/64-bit data blocks. Step 1012 transmits the 66/64 bit data blocks via a SFI4.2 interface at a rate proportional to the line clock rate.

In one aspect, draining the bytes for each channel from the source in Step 1006 includes substeps. Step 1006a determines if the source is loaded with a byte of data for each channel. If the source is loaded with a byte of data for a channel, Step 1006b generates a data valid signal for that channel. If the source is not loaded with a byte of data for a channel, Step 1006c generates a data invalid signal for that channel. Then, adding the 2-bit control word to each segment in Step 1010 includes the following substeps. Step 1010a generates a segment valid control word in response to receiving a data valid signal for every byte of data in the segment. Step 1010b generates a segment invalid control word in response to receiving a data invalid signal for at least one byte of data in the segment.

In another aspect, interleaving the bytes of data into four 64-bit segments in Step 1008 includes interleaving the bytes of data into a sequence of byte positions. Then, generating the segment invalid control word (Step 1010b) includes additional substeps. Step 1010b1 generates a map word cross-referencing valid bytes of data in the segment to byte positions. Step 1010b2 adds the map word to the segment in a predetermined byte position. The map word cross-references valid bytes of data to corresponding channels, and to byte positions in the segment. In one aspect, Step 1010b2 adds the map word to a segment in place of an invalid byte of data. For example, the valid bytes of data may be shifted to end byte positions in the segment, and the map word added to an initial byte position in the segment. In one aspect, Step 1011 scrambles the 64-bit segments prior to adding the 2-bit control words to the segments. Alternately stated, just the data bytes (64 bits) of the 66-bit data block are scrambled.

FIG. 11 is a flowchart illustrating a method for receiving SerDes SFI4.2 interface lanes and transmitting asynchronous channels. The method begins at Step 1100. Step 1102 accepts four lanes of 66/64 bit data blocks via a SFI4.2 interface at a rate proportional to a line clock rate. Step 1104 extracts a 2-bit control word from each data block, creating 64-bit segments. The control word indicates the validity of bytes of data in the segment. Step 1106 deinterleaves the segments into bytes of data. In one aspect, Step 1105 may descramble the segments prior to deinterleaving the segments in Step 1106. Alternately stated, the 64-bit segments may be descrambled after extracting the control words, or just the data bytes of the 66-bit data blocks may be descrambled. (the control word is not descrambled). Step 1108 loads bytes of data for a plurality of channels at the line clock rate into a destination. The destination may be a FIFO memory, mapper, or combination of FIFOs and mappers. Step 1110 drains the bytes of data for each channel from the destination at an asynchronous channel clock rate. Step 1112 transmits the bytes of data for each channel at its corresponding channel clock rate. For example, the bytes of data may be transmitted via one of the following sets of channels: one 10 gigahertz (10 G), four 2.5 G, three 2.5 G and two 1.25 G, two 2.5 G and four 1.25 G, one 2.5 G and six 1.25 G, or eight 1.25 G data channels.

In one aspect, extracting the 2-bit control word from each segment in Step 1104 includes the following substeps. Step 1104a extracts a segment valid control word in response to the receiving a segment with only valid bytes of data. Step 1104b extracts a segment invalid control word in response to receiving a segment with at least one invalid byte of data. Then, loading the bytes into each destination in Step 1108 includes the following substeps. In response to the 2-bit control word, Step 1108a determines the validity of each byte of data in a segment. If a byte of data is valid for a channel, Step 1108b loads the byte of data into the destination and generates a data valid signal for that channel. If a byte of data is invalid for a channel, Step 1108c does not load a byte of data into the destination and generates a data invalid signal for that channel.

In another aspect, creating the 64-bit segments in Step 1104 includes creating segments with sequential byte positions. Then, extracting the segment invalid control word in Step 1104b includes extracting a map word, located in a predetermined byte position in the segment, which cross-references valid bytes of data in the segment to byte positions. More explicitly, Step 1104b extracts a map word cross-referencing valid bytes of data to corresponding channels, and to byte positions in the segment. Typically, the map word is extracted from a segment in place of an invalid byte of data. In one example, Step 1104 creates segments where the valid bytes of data are shifted to end byte positions in the segment, and Step 1104b extracts the map word from an initial byte position in the segment.

A system and method have been provided for transmitting and receiving asynchronous data channels via a SFI4.2 interface. Examples of particular devices and method steps have been presented as examples to illustrate the invention, but the invention is not limited to merely these examples. Other variation and embodiments of the invention will occur to those skilled in the art.

I claim:

1. A method for transmitting asynchronous channels of information via a SerDes Framer Interface (SFI), the method comprising:
    loading data from a plurality of channels operating at asynchronous clock rates into a source;
    draining data for a channel from the source at a line clock rate;
    interleaving the data from the plurality of channels into a plurality of segments with a sequence of byte positions;
    adding control words to segments, creating data blocks, wherein a control word indicates validity of data within corresponding data blocks, wherein, if data within a data block is invalid, the adding control words comprises:
        generating a map word cross-referencing valid bytes of data in a corresponding segment to byte positions; and
        adding the map word to the corresponding segment in a predetermined position; and,
    transmitting the data blocks via a the SFI at a rate proportional to the line clock rate.

2. The method of claim 1, wherein the draining comprises:
    determining if the source is loaded with a byte of data for the channel;
    if the source is loaded with a byte of data for the channel, generating a data valid signal for that channel;
    if a source is not loaded with a byte of data for the channel, generating a data invalid signal for the channel;
    wherein the adding control words to segments comprises:
    generating a segment valid control word in response to receiving a data valid signal for every byte of data in each segment; and,
    generating a segment invalid control word in response to receiving a data invalid signal for at least one byte of data in each segment.

3. The method of claim 1 wherein generating the map word includes generating the map word cross-referencing valid bytes of data to a corresponding channel, and to byte positions in the corresponding segment.

4. The method of claim 3 wherein adding the map word to the corresponding segment includes adding the map word to the corresponding segment in place of an invalid byte of data.

5. The method of claim 4 wherein cross-referencing valid bytes of data to corresponding channels byte positions in the corresponding segment comprises shifting the valid bytes of data to end byte positions in the corresponding segment; and,
    wherein adding the map word includes adding the map word to an initial byte position in the corresponding segment.

6. The method of claim 1, wherein the SFI comprises a SFI 4.2 interface, and wherein loading data from the plurality of channels includes loading a set of channels selected from a group consisting of one 10 gigahertz (10 G), four 2.5 G, three 2.5 G and two 1.25 G, two 2.5 G and four 1.25 G, one 2.5 G and six 1.25 G, and eight 1.25 G data channels.

7. The method of claim 1 further comprising:
    prior to adding the control words, scrambling the segments, wherein each segment comprises 64 bits, and wherein each control word comprises 2 bits.

8. A method for receiving SerDes Frame Interface (SFI) lanes and transmitting asynchronous channels, the method comprising:
    accepting lanes of data blocks via a SFI at a rate proportional to a line clock rate;
    extracting control words from data blocks, creating segments with sequential byte positions, where a control word indicates the validity of bytes of data in a segment, wherein, if a byte of data in a segment is invalid, the extracting control word comprises extracting a map word that cross-references valid bytes of data in the segment to byte positions, wherein the map word is located in a predetermined byte position in the segment;
    deinterleaving the segments into bytes of data;
    loading bytes of data for a plurality of channels, at the line clock rate, into a destination;
    draining the bytes of data for a channel from the destination at asynchronous channel clock rate; and,
    transmitting the bytes of data for a channel at its corresponding channel clock rate.

9. The method of claim 8, wherein the extracting control words comprises:
    extracting a segment valid control word in response to the receiving a segment with only valid bytes of data;
    extracting a segment invalid control word in response to receiving a segment with at least one invalid byte of data;
    wherein the loading the bytes comprises:
        in response to a control word, determining validity of each byte of data in a segment;
        if a byte of data is valid for a channel, loading the byte of data into the destination and generating a data valid signal for the channel;
        if a byte of data is invalid for the channel, not loading the destination and generating a data invalid signal for the channel.

10. The method of claim 8 wherein extracting the map word includes extracting a map word cross-referencing valid bytes of data to corresponding channels, and to byte positions in the segment.

11. The method of claim 10 wherein the extracting the map word comprises extracting the map word from a segment in place of an invalid byte of data.

12. The method of claim 11 wherein creating the segments comprises creating segments where the valid bytes of data are shifted to end byte positions in the segment; and,
    wherein extracting the map word comprises extracting the map word from an initial byte position in the segment.

13. The method of claim 8, wherein the SFI comprises a SFI 4.2 interface, and wherein transmitting the bytes of data for each channel includes transmitting via a set of channels selected from a group consisting of one 10 gigahertz (10 G), four 2.5 G, three 2.5 G and two 1.25 G, two 2.5 G and four 1.25 G, one 2.5 G and six 1.25 G, and eight 1.25 G data channels.

14. The method of claim 8 further comprising,
    prior to deinterleaving the segments into bytes of data, descrambling the segments, wherein each segment comprises 64 bits, and wherein each control word comprises 2 bits.

15. A system for transmitting asynchronous channels of information via a SerDes Frame Interface (SFI) interface, the system comprising:
    a channel interface configured to accept data for a plurality of channels at asynchronous channel clock rates;
    a source module comprising an input configured to load data from a channel at a channel clock rate, and outputs configured to drain the bytes of data from the channel at a line clock rate;
    an interleaver comprising an input configured to receive the data from a channel, wherein the interleaver is configured to interleave the data into a plurality of segments with a sequence of byte positions, add control words to segments, and create data blocks supplied at an output, where the control word indicates the validity of bytes of data within a data block, wherein, in response to receiving at least one invalid byte of data, the interleaver is configured to generate a map word cross-referencing valid bytes of data in the segment to byte positions, and add the map word to the segment in a predetermined byte position; and, an SFI interface comprising an input configured to accept the data blocks and an output configured to supply the data blocks at a rate proportional to the line clock rate.

16. The system of claim 15, wherein the source module is configured to generate a data valid signal for a channel if it is loaded with a byte of data, and a data invalid signal if it not loaded with a byte of data; and, wherein the interleaver is configured to accepts the data valid and data invalid signals and generates a segment valid 2-bit control word in response to receiving a data valid signal for every byte of data in the segment, and a segment invalid control word in response to receiving a data invalid signal for at least one byte of data in the segment.

17. The system of claim 15 wherein the interleaver is configured to generate a map word cross-referencing valid bytes of data to corresponding channels, and to byte positions in the segment.

18. The system of claim 17 wherein the interleaver is configured to add the map word to a segment in place of an invalid byte of data.

19. The system of claim 18, wherein the interleaver is configured to shift the valid bytes of data to end byte position in the segment and add the map word to an initial byte positions in the segment.

20. The system of claim 15, wherein the SFI comprises a SFI 4.2 interface, and wherein the channel interface accepts channels selected from a group consisting of one 10 gigahertz (10 G), four 2.5 G, three 2.5 G and two 1.25 G, two 2.5 G and four 1.25 G, one 2.5 G and six 1.25 G, and eight 1.25 G data rates.

21. The system of claim 15 further comprising:
a scrambler module comprising an input configured to accept four 64-bit segments and an output configure to supply four 64-bit scrambled segments.

22. The system of claim 15 wherein the source module is selected from the group consisting of a plurality of first-in first-out (FIFO) memories, a demapper, a plurality of demappers, and a combination of demappers and FIFOs.

23. A system for receiving SerDes Frame Interface (SFI) lanes and transmitting asynchronous channels, the system comprising:
an SFI module comprising a SFI interface configured to accept lanes of data blocks at a rate proportional to a line clock rate, and an output configured to supply the data blocks;
a deinterleaver comprising an input configured to accept the data blocks, wherein the deinterleaver is configured to
extract control words from data blocks, create segments, wherein a control word indicates the validity of bytes of data in a segment,
deinterleave the segments into bytes of data supplied at an output, and,
in response to receiving a segment with at least one invalid byte of data, extract a map word located in a predetermined byte position in the segment, wherein the map word cross-references valid bytes of data in the segment to byte positions;
a destination module comprising an input configured to load bytes of data for a plurality of channels at the line clock rate, and an output to configured to supply the bytes of data for a channel at asynchronous channel clock rates; and,
a channel interface comprising an input configured to accept bytes of data from the destination module and an output configured to supply the bytes of data for the channels at corresponding channel clock rates.

24. The system of claim 23 wherein the deinterleaver is configured to extract a segment valid 2-bit control word in response to the receiving a segment with only valid bytes of data, and extracts a segment invalid control word in response to receiving a segment with at least one invalid byte of data, generate a data valid signal for each corresponding valid byte of data and a data invalid signal for each corresponding invalid byte data; and, wherein the destination module comprises inputs configured to accept the data valid and data invalid signals, wherein the destination module is configured to load a byte of data from the deinterleaver for a channel in response to a corresponding data valid signal, and not load a byte of data for a channel in response to a corresponding data invalid signal.

25. The system of claim 23 wherein the deinterleaver is configured to extract a map word cross-referencing valid bytes of data to a corresponding channel, and to byte positions in the segment.

26. The system of claim 25 wherein the deinterleaver is configured to extract the map word from the segment in place of an invalid byte of data.

27. The system of claim 26 wherein the deinterleaver is configured to create segments where the valid bytes of data are shifted to end byte positions in the segment and extract the map word from an initial byte position in the segment.

28. The system of claim 23, wherein the SFI comprises a SFI 4.2 interface, and wherein the channel interface supplies channels selected from a group consisting of one 10 gigahertz (10 G), four 2.5 G, three 2.5 G and two 1.25 G, two 2.5 G and four 1.25 G, one 2.5 G and six 1.25 G, and eight 1.25 G data rates.

29. The system of claim 23 further comprising
a descrambler comprising an input configured to accept four 64-bit segments and an output configured to supply four descrambled 64-bit segments.

30. The system of claim 23 wherein the destination module is selected from the group consisting of a plurality of first-in first-out (FIFO) memories, a mapper, a plurality of mappers, and a combination of mappers and FIFOs.

* * * * *